| United States Patent [19] | [11] Patent Number: 4,938,983 |
| --- | --- |
| Peignier et al. | [45] Date of Patent: Jul. 3, 1990 |

[54] STABLE SUSPENSIONS OF SOLID PARTICULATES IN AQUEOUS MEDIA

[75] Inventors: Michel Peignier, Versailles; Marie-Madeleine Besnard, Antony, both of France

[73] Assignee: Rhone-Poulenc Specialites Chimiques, Courbevoie, France

[21] Appl. No.: 60,980

[22] Filed: Jun. 10, 1987

Related U.S. Application Data

[63] Continuation of Ser. No. 695,372, Jan. 28, 1985, abandoned.

[30] Foreign Application Priority Data

Jan. 31, 1984 [FR] France .............................. 84 01443

[51] Int. Cl.$^5$ ................. A23L 1/0522; A23L 1/0526; A23L 1/054
[52] U.S. Cl. .................................... 426/573; 426/589; 426/658; 426/578; 426/579; 106/205; 252/304; 44/51

[58] Field of Search ............... 426/573, 578, 579, 589, 426/658; 106/205; 252/304; 44/57

[56] References Cited

U.S. PATENT DOCUMENTS

| 3,659,026 | 4/1972 | Schuppner | 514/782 |
| 4,038,206 | 7/1977 | Karl | 106/205 |
| 4,363,669 | 12/1982 | Cottrell et al. | 106/205 |

OTHER PUBLICATIONS

Whistler, Roy L., Industrial Gums, Academic Press, New York, 1973 pp. 323-333.

*Primary Examiner*—Jeanette Hunter
*Attorney, Agent, or Firm*—Burns, Doane, Swecker & Mathis

[57] ABSTRACT

Suspensions of solid particulates in aqueous media, useful, e.g., as thickeners in a wide variety of foodstuff and industrial applications, are sedimentations stabilized by incorporating therein a stabilizing amount of xanthan/-carob gum, optionally starch admixture.

14 Claims, No Drawings

STABLE SUSPENSIONS OF SOLID PARTICULATES IN AQUEOUS MEDIA

This application is a continuation, of application Ser. No. 695,372, filed Jan. 28, 1985.

BACKGROUND OF THE INVENTION

1. Field of the Invention:

The present invention relates to liquid, aqueous suspensions of solid particles stabilized by a mixture of xanthan and carob gums.

2. Description of the Prior Art:

Maintaining water insoluble solid particulates in suspension in aqueous media is of significant interest in a wide variety of industrial applications, such as agriculture, the food and animal feed industries, the petroleum industry, the coal, glass paper and paint industries, and so forth. In these applications, the sedimentation of the solid particulates during storage and transportation, and also the re-homogenization of the sedimented particles at the point of use, continue to present a number of problems.

The stabilizing effect of xanthan gum influencing the viscosity of solutions is of course known to this art. For a given material, the concentration of the gum required to achieve acceptable suspension is a function of the density and the particle size of the material. In certain cases, the concentration required may impart an excessive increase in viscosity that is undesired and detrimental. Even with a thickening agent such as xanthan gum, the solid particles tend to sediment, particularly the coarsest ones, in spite of the fact that the medium enables the suspension of the majority of the particles. It then becomes extremely difficult after an extended period of storage to re-suspend the sedimented particles because of their having become naturally compacted at the bottom of the container.

Mixtures of xanthan gum and carob gum are described in U.S. Pat. No. 3,557,016. These mixtures produce stable, heat reversible aqueous gels by heating followed by cooling or by cold dissolution under agitation at a high shear rate. In the hot process the concentration of the aqueous phase ranges from 0.02 to 4%, preferably from 0.1 and 1%, while in the cold process it ranges from 0.1 to 2%. In both cases, a marked synergistic increase in the strength of the gel or the viscosity of the solution is observed. This behavior is utilized practically in the preparation of thickening and gelling compositions.

SUMMARY OF THE INVENTION

It has now unexpectedly been discovered, and which is a major object of the present invention, that in an aqueous medium very small amounts of a mixture of xanthan gum and carob gum, and optionally starch, enable the realization of great capacity for significantly enhanced suspension vis-a-vis the prior art, without at the same time being detrimental to the fluidity of the composition and without giving rise to a compacting of the particles which might become deposited by sedimentation after extended period of storage, and the immediately aforesaid is all the more unexpected in light of the fact that admixture of xanthan and other galactomannans, such as guar gum, does not provide the improved results attainable consistent herewith.

DETAILED DESCRIPTION OF THE INVENTION

More particularly according to the present invention, the topic suspensions of solid particles contain, in solution, 0.01 to 0.1% by weight of a mixture of xanthan gum and carob gum, with the weight ratio xanthan gum/carob gum ranging from 30/70 to 70/30.

Xanthan gum is a known heteropolysaccharide having a molecular weight of several million and produced by the fermentation of carbohydrates under the action of bacteria of the species Xanthomonas, and more particularly the species *Xanthomonas camoestris*. Xanthan gums are produced commercially and are readily available.

The density and grain size distribution of the solid particles may vary over a very wide range. By way of example, particles having a density of from 1.1 to 10 and a grain size distribution of up to 200 $\mu$m have been placed in suspension in aqueous media according to the invention. Exemplary of such solid, water insoluble particles, the following are representative: pigments, such as titanium oxide; abrasive particles, such as cerium oxide; mineral or inorganic fillers, such as magnesium oxide, calcium carbonate, iron oxide; seeds; fruit pulp; pesticides; insecticides; and a variety of other water insoluble materials.

The concentration of the insoluble particulates in suspension according to the invention may reach very high values, for example, up to 80% of the total weight of the suspension.

In one embodiment according to the invention, of particular interest with respect to particles having a grain size distribution greater than approximately 100 $\mu$m, the aqueous medium contains, in addition to the xanthan gum and the carob gum, a water soluble starch. The addition of the starch does not appreciably alter the viscosity of the medium, but is of assistance in maintaining the particles in suspension. The starch used may be of any type, such as, for example, wheat, corn, rice, or potato starch, pretreated for solubilization in cold water. The starch is advantageously introduced into the suspension in an amount of 0.05 to 0.3% by weight, based upon the total weight of the suspension.

As a function of the specific application and storage conditions, in each particular case dispersing agents, such as alkali metal polyphosphates, for example, sodium tripolyphosphate, are advantageously incorporated in the composition, together, when required, with other additives, for example, preservatives, bactericides, colorants, anti-foaming agents, inorganic or organic salts, or any other compound soluble in water.

The formulation of the suspensions according to the invention may be carried out by dissolving the mixture of gums in the aqueous medium, under agitation, and preferably in the cold state, followed by the dispersion therein of the insoluble particulate material. Alternatively, it is possible to disperse the solid particles in water, then adding and dissolving therein the mixture of gums under agitation. The admixture of the gums is typically introduced in the form of an aqueous solution having a gum concentration of 2-4% by weight.

The factor determining the selection of a binary or ternary mixture, the relative proportions of each of the colloids and the temperature of preparation is the size of the particles to be placed in suspension.

In the case of dense and fine particles, the cold process is preferred (temperature less than 30° C.) which provides good maintenance in suspension while imparting a low viscosity to the subject compositions. For coarser particles, larger than approximately 100 μm, it is preferable to use a ternary mixture with starch, with the dissolution being effected by heating to a temperature in excess of 30° C., for example, 30–80° C. and preferably 65–75° C.

The low colloid content of the solutions provides the suspensions according to the invention with rheological properties making it possible to pour, pump or inject them without difficulty. The subject suspensions have improved stability and dispersibility properties with respect to the use of xanthan gum alone, in the same proportions. These properties enable their application in all food or industrial fields.

In order to further illustrate the present invention and the advantages thereof, the following specific examples are given, it being understood that same are intended only as illustrative and in nowise limitative.

EXAMPLE 1:

Suspension of cerium oxide particulates:

A 0.085% (weight/volume) solution of a mixture of xanthan gum (Rhodopol 23, marketed by Rhone-Poulenc Specialites Chimiques) and carob gum in a weight ratio of 50/50 was used. The solution was prepared by dissolution of the gums at 20° C. in tap water under agitation maintained for 10 min at 800 rpm. This solution had a viscosity of 100 mPa.s (Rheomat 30 - MSO system with a velocity gradient of 0.24 s$^{-1}$).

Into a 1 liter test tube, 937 ml of the above solution were introduced, to which were added 3 g sodium tripolyphosphate (TPP) as the dispersing agent, 10 g of a 30% aqueous solution of formaldehyde and, lastly, 50 g cerium oxide (CEROX 1650, also marketed by Rhone-Poulenc Specialites Chimiques) having a density of 6.9 and a grain size of less than 10 μm.

After homogenization, the suspension was permitted to stand. Sedimentation and compaction were evaluated by means of the following tests:

Sedimentation:

The density was measured as a function of time in the upper ⅓ of the test tube and compared to that of a control prepared in the same manner, but without the addition of the stabilizing admixture of gums.

Compaction:

A sample of 250 ml was stored in a 250 ml stoppered bottle for 3 days. The bottle was then rotated at 90° C. about its vertical axis at a velocity of 1 rps for 30 sec, these conditions being sufficient to place into suspension a dispersion of CEROX 1650 in water without any additive (no compaction.) The redispersed fraction of the CEROX was eliminated with the liquid. The dry extract of the compacted and un-redispersed fraction was determined.

The results were as follows:

(i) Sedimentation

| Time | (i) Sedimentation | |
|---|---|---|
| | Density | |
| (min) | Control | Example 1 |
| 0 | 1.043 | 1.043 |
| 10 | 1.039 | 1.043 |
| 20 | 1.037 | 1.042 |
| 40 | 1.032 | 1.040 |
| 60 | 1.026 | 1.034 |

(ii) Cerox compacted (in %):

Control (without stabilizer) 35
Example 1 . . . less than 1

This suspension was suitable for the polishing of inorganic glasses, requiring short term stability without long term compaction.

EXAMPLE 2:

Suspension of carbon particulates:

A synthetic fuel, approximately 66% carbon and exhibiting very poor stability upon storage and very strong compaction, was used.

To 100 g of the fuel, 1 g of a solution of 30% formaldehyde and 0.15 g TPP were added, and then 1.2 g of a 2.5% aqueous solution of xanthan gum and carob gum, said gums being present in a proportion by weight of 40/60. The viscosity was measured at time 0 ($t_0$) and after standing for 10 days, and the stability was determined after a storage period of 15 days at 23° C.

The results were as follows:

| | | Viscosity (mPa.s)* | | Stability |
|---|---|---|---|---|
| | | 2 t/min | 10 t/min | observations |
| Control | $t_0$ | 12,000 | 4,600 | Water rise of 2 cm/10 cm |
| | 10 days | — | — | Total compaction under water layer |
| Example 2 | $t_0$ | 12,000 | 4,600 | Water rise of 0 mm/10 cm |
| | 10 days | 8,000 | 3,000 | homogeneous; no deposit; good flow characteristics |

*Brookfield RV - Needle No. 5, 23° C.

EXAMPLE 3:

Suspension of iron oxide particulates:

In a 100 ml test tube, 10 g ferrous oxide having an density of 5.3 and a grain size of less than 10 μm were dispersed in 90 ml of a 0.085% solution of 50/50 xanthan gum/carob gum formulated at 20° C. (according to Example 1).

The percentage of the volume in suspension was measured as a function of time in comparison with a suspension prepared under the same conditions, but containing 0.15% xanthan gum and no carob gum. This solution had a viscosity of 400 mPa.s.

| | Volume In Suspension (%) | | | | |
|---|---|---|---|---|---|
| Duration (days) | 1 | 3 | 5 | 10 | 20 |
| Xanthan/carob, 0.085% | 100 | 98 | 95 | 90 | 76 |
| Xanthan alone, 0.15% | 90 | 75 | 65 | 51 | 38 |

It was thus determined that the suspension capacity of the medium containing the mixture of gums was appreciably improved, particularly over the long term, with respect to xanthan gum alone used in twice the concentration and providing a viscosity four times higher.

EXAMPLE 4:

Suspension of glass beads:

In a 100 ml test tube, 10 g of glass beads having an approximate density of 2.5 and a grain size distribution of from 160 to 250 μm were placed in suspension in 90 ml of a solution containing, by weight, 0.0425% xanthan, 0.0425% carob and 0.085% precooked corn starch (Societe des Produits du Mais). The mixture was dissolved at 70° C. The percentage of the volume in suspension as a function of time was as follows:

| | |
|---|---|
| 1 day | 98% |
| 5 days | 75% |
| 20 days | 50% |
| 30 days | 50% |

The same glass beads, when placed in suspension in water, sedimented very rapidly and the volume in suspension was only 7% in less than one minute.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter which comprises a suspension of water insoluble solid particulates in an aqueous medium, said aqueous medium comprising a suspension stabilizing amount of a mixture of xanthan and carob gums, wherein the suspension stabilizing amount comprises from 0.01 to 0.1 percent by weight of dissolved xanthan and carob gums in said aqueous medium, the ratio by weight of xanthan gum to carob gum ranging from 30/70 to 70/30.

2. The composition of matter as defined by claim 1, said aqueous medium further comprising a suspension stabilizing amount of a water soluble starch.

3. The composition of matter as defined by claim 2, said aqueous medium comprising from 0.05 to 0.3% by weight of dissolved starch.

4. The composition of matter as defined by claim 1, said aqueous medium further comprising a water soluble dispersing agent.

5. The composition of matter as defined by claim 4, said dispersing agent comprising an alkali metal polyphosphate.

6. The composition of matter as defined by claim 1, said solid particulates in suspension having a density ranging from 1.1 to 10 and a grain size distribution of up to 200 μm.

7. A process for the formulation of the composition of matter as defined by claim 1, comprising dissolving said xanthan and carob gums in said aqueous medium at a temperature of less than about 30° C., the solid particulates being suspended therein either before or after said dissolution.

8. A process for the formulation of the composition of matter as defined by claim 4, comprising dissolving said xanthan and carob gums and said starch in said aqueous medium at a temperature of at least about 30° C., the solid particulates being suspended therein either before or after said dissolution.

9. The composition of matter as defined in claim 1 wherein the insoluble solid particulates comprise edible comestibles.

10. The composition cf matter as defined in claim 1, said solid particulates comprising carbon particles so as to form a stabilized synthetic fuel.

11. A method of stabilizing particulate suspensions comprising providing an aqueous suspension of water insoluble particulates, adding a suspension stabilizing amount of a mixture of xanthan and carob gums, wherein a suspension stabilizing amount comprises from 0.01 to 0.1 percent by weight of dissolved xanthan and carob gums in said aqueous medium, the ratio by weight of xanthan gum to carob gum ranging from 30/70 to 70/30.

12. The method of claim 11 further comprising the step of adding a suspension stabilizing amount of water soluble starch.

13. The method of claim 11 further comprising the step of adding a water soluble dispersing agent to the aqueous medium.

14. The method of claim 11 wherein said solid particulates in suspension have a density of from 1.1 to 10 specific gravity and a grain size distribution of up to 200 m.

* * * * *